United States Patent [19]

Kountz et al.

[11] 4,151,725

[45] May 1, 1979

[54] CONTROL SYSTEM FOR REGULATING LARGE CAPACITY ROTATING MACHINERY

[75] Inventors: Kenneth J. Kountz, Hoffman Estates, Ill.; Richard A. Erth; Bruce K. Bauman, both of York, Pa.

[73] Assignee: Borg-Warner Corporation, Chicago, Ill.

[21] Appl. No.: 816,428

[22] Filed: Jul. 18, 1977

Related U.S. Application Data

[63] Continuation-in-part of Ser. No. 794,884, May 9, 1977, abandoned.

[51] Int. Cl.$^2$ ............................ F04B 49/10; F25B 1/00
[52] U.S. Cl. .......................................... 62/182; 62/228; 417/19; 417/32
[58] Field of Search ................. 62/228, 229, 230, 182, 62/209; 417/25, 19, 32, 47

[56] References Cited

U.S. PATENT DOCUMENTS

| | | | |
|---|---|---|---|
| 3,355,906 | 12/1967 | Newton | 62/228 X |
| 3,555,844 | 1/1971 | Fleckenstein | 62/228 X |
| 3,780,532 | 12/1973 | Norbeck et al. | 62/228 X |

Primary Examiner—William E. Wayner
Attorney, Agent, or Firm—James J. Jennings

[57] ABSTRACT

The control system of the invention regulates a centrifugal compressor having inlet guide vanes adjustable as one means for varying the compressor capacity. A variable speed motor is connected to drive the compressor, and provides another means for regulating the compressor capacity. The control system regulates the motor speed alone over one portion of the load variation curve, and regulates the motor speed jointly with the inlet guide vane opening over another portion of the load variation curve, to achieve the most energy-efficient operating condition while avoiding the surge condition. This optimum control path is realized by utilizing a signal which is a measure of the compressor head value. Compressor surge or instability is avoided by deriving a critical Mach number (speed indication) for any given operating condition, as a function of the compressor head and vane position, and preventing the motor speed from going below that Mach number under the specific operating conditions. The control system of the invention is useful both with existing equipment, by way of retrofit, and with newly manufactured and installed equipment.

24 Claims, 16 Drawing Figures

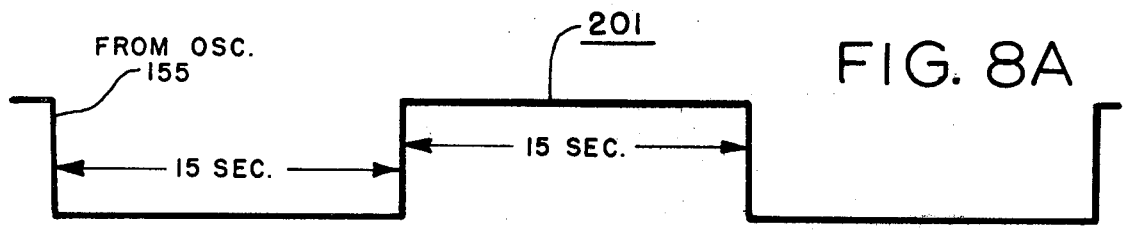
FIG. 8A
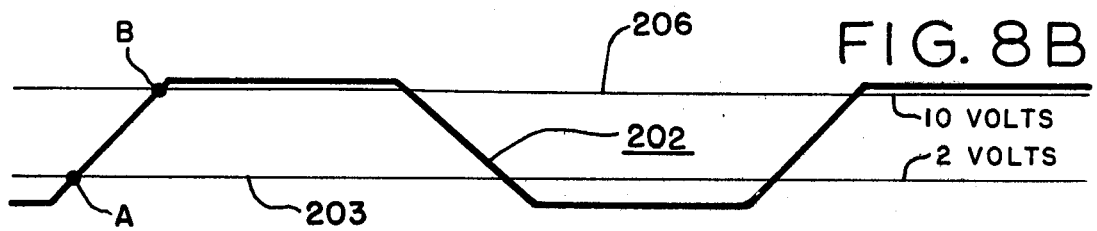
FIG. 8B
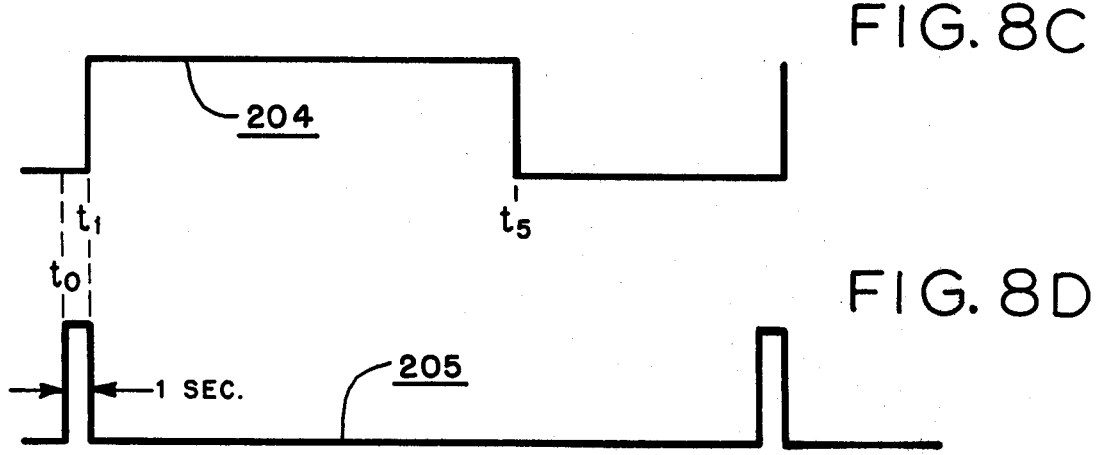
FIG. 8C
FIG. 8D
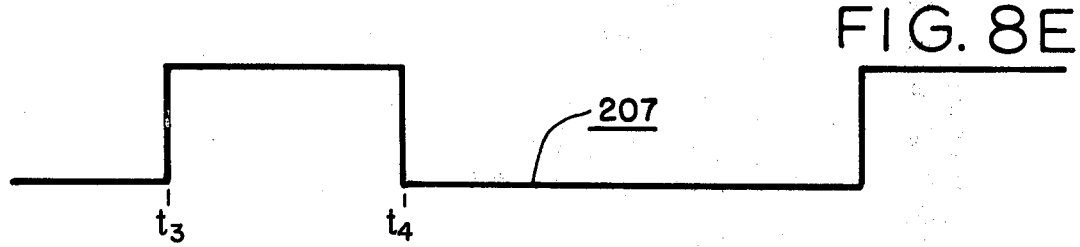
FIG. 8E
FIG. 8F

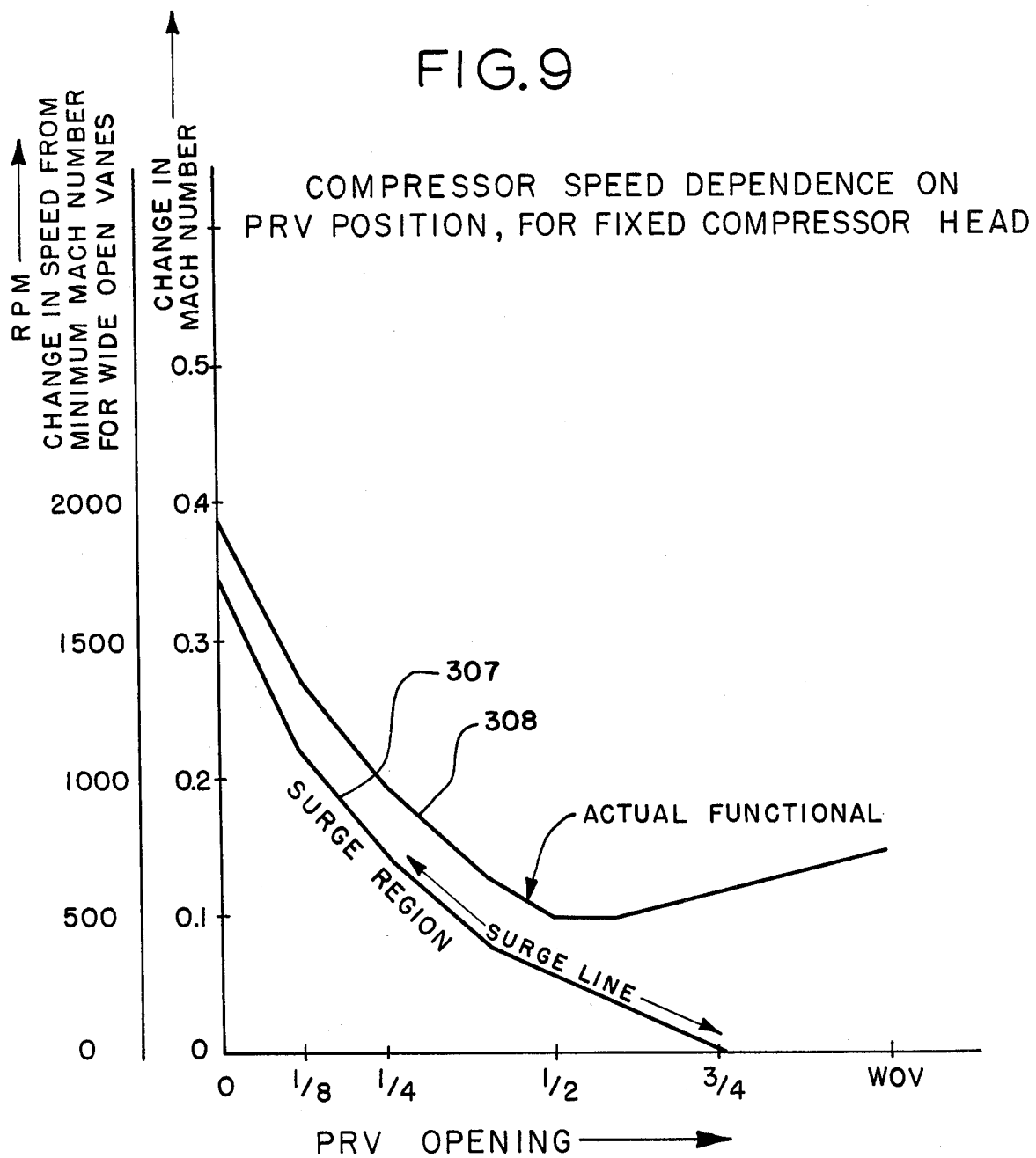

CONTROL SYSTEM FOR REGULATING LARGE CAPACITY ROTATING MACHINERY

This application is a continuation-in-part of applicants' earlier application of the same title filed May 9, 1977, with Ser. No. 794,884, now abandoned.

BACKGROUND OF THE INVENTION

Large capacity air conditioning systems have used centrifugal compressors with guide vanes at the compressor inlet, which vanes are adjustable to regulate both the direction (or "swirl") of the incoming gas and also produce a pressure drop which is a function of the vane position. These vanes, sometimes termed pre-rotation vanes (PRV), are thus adjusted to vary the capacity of the compressor. In the condition of wide-open vanes (WOV) a small change in the vane position does not have a substantial effect on the compressor head or capacity. When the PRV are nearly closed a slight change has a very substantial effect on the compressor capacity, and could even send the compressor into surge if care is not taken in adjusting the vane position. Because capacity control solely by changing PRV position is an inefficient method of capacity control, there have been attempts to regulate system capacity only by governing the speed of the electrical motor driving the compressor. If speed control is utilized as the only means of regulating the capacity, the compressor can only be operated down to about 70% of its full load. This is economically impractical for large installations, since for substantial periods of time the load is below 70% of the full load value.

Accordingly various attempts have been made to combine adjustment of the PRV with regulation of the motor speed, which can successfuly reduce the load down to about 10% of full load. One significant early effort in this direction is taught in U.S. Pat. No. 3,355,906, entitled "Refrigeration System Inlcuding Control for Varying Compressor Speed", which issued Dec. 5, 1967, and is assigned to the assignee of this invention. In that arrangement the motor speed was adjusted as a function of the ratio between the compressor suction pressure and discharge pressure, and the PRV were adjusted in relation to a signal derived from the temperature of the heat exchange medium at the discharge of the evaporator. Most similar efforts since that time have used the pressure ratio of the compressor to regulate the motor speed, and derivation of this pressure information has proved difficult and expensive in practice. In addition it has been found that the regulation of the pre-rotation vanes is a complex function, which has not been effectively controlled to avoid surge and provide most efficient operation by sensing of only a single variable condition.

It is therefore a primary object of the present invention to provide a control system for regulating a refrigeration system, such as one including a centrifugal compressor, in which not only are the motor speed controlled and PRV position adjusted, but this speed control and vane adjustment are achieved over an optimum path of control with minimum energy expended.

A related important aspect of the invention is the provision of such a control system which achieves such energy effective system operation, and at the same time avoids surge.

Of prime importance is the provision of such a control system, which is not only capable of installation with new equipment, but is readily installed on existing systems to achieve the optimum control path while avoiding surge in those systems.

Still another important object of the invention is linearization of the PRV action, through a controller with a non-linear duty cycle to produce more uniform system control.

Another important object of the invention is to achieve such precise system operation over a wide load range without the necessity of sensing compressor pressures to derive the compressor head value.

SUMMARY OF THE INVENTION

The control system of the invention is useful to regulate a refrigeration system including a compressor, a condenser and an evaporator, all connected in a closed refrigeration circuit. Inlet guide vanes are positioned between the evaporator and the compressor to regulate the capacity of the compressor, and some means, such as an electrical motor, is connected to adjust the inlet guide vanes' position. Means, such as another electrical motor, drives the compressor. The control system of the invention is connected to regulate both the means for adjusting the guide vanes' position and the means for driving the compressor. A first temperature sensing means is positioned adjacent the condenser to provide a first signal related to the refrigerant condensing temperature, and a second sensing means is positioned in the evaporator to provide a second signal related to the refrigerant evaporating temperature. A summation means is connected to receive both the first and second signals, and to provide a resultant signal which connotes the head of the compressor. The control system uses the resultant signal to regulate the refrigeration system. A third temperature sensing means is positioned adjacent the chilled water discharge of the evaporator to provide a third signal. An adjustable means is provided in the control system for establishing a temperature set point signal. Means is also provided for combining the third signal and the temperature set point signal to produce another regulating signal, for use in controlling the refrigeration system.

In accordance with another aspect of the invention, an additional means is coupled to the inlet guide vanes for providing an electrical signal which indicates the physical position of the inlet guide vanes. Means is provided for combining the inlet guide vane position signal with the resultant signal to produce a regulating signal for use in system regulation.

THE DRAWINGS

In the several figures of the drawings, like reference numerals identify like components, and in those drawings:

FIGS. 8A–8F are graphical illustrations useful in explaining one aspect of the invention; and FIG. 9 is a graph of compressor speed dependence on PRV position, for a fixed head value.

DETAILED DESCRIPTION OF THE INVENTION

Figure 1:
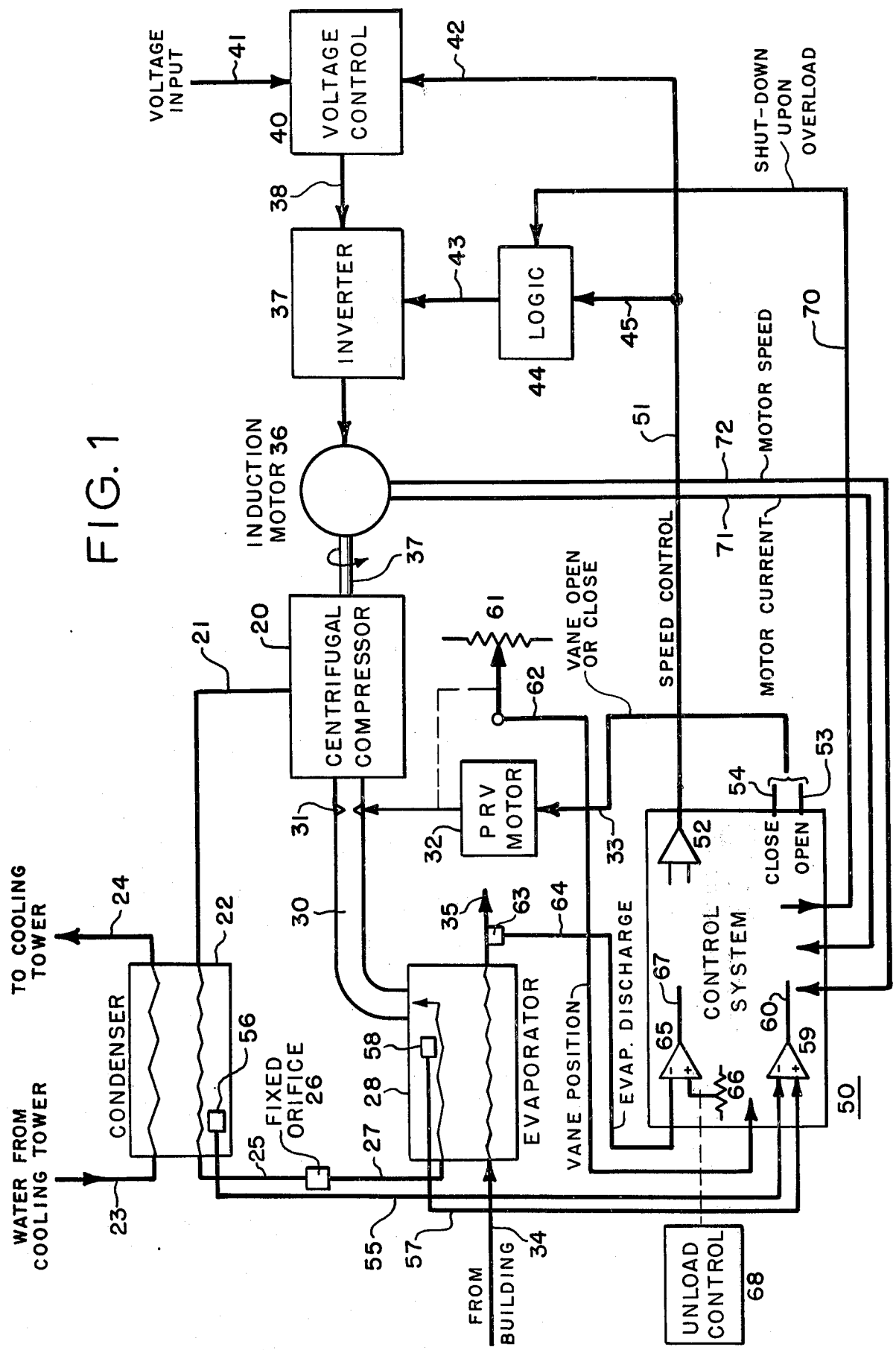
FIG. 1 is a block diagram illustrating the incorporation of the control system of this invention into a cooling system which includes a centrifugal compressor.

FIG. 1 depicts certain conventional components of a cooling system, such as a centrifugal compressor 20 for passing refrigerant (such as R-11 or another suitable medium) through line 21 to a condenser 22. In the condenser the water from the cooling tower passes from line 23 into the condenser, and is returned over line 24 to the cooling tower, or to the other head rejection means when difficult systems are used. The refrigerant at the discharge side of condenser 22 is passed over line 25, through a fixed orifice 26, and line 27 to the refrigerant inlet connection of the evaporator. The refrigerant passes through the evaporator and out the duct 30, which includes a plurality of inlet guide vanes 31 positioned as shown. In this description the inlet guide vanes are termed PRV, or pre-rotation vanes, and the position of the PRV is regulated by a small motor 32 which receives a control signal over a plurality of conductors, here represented as a single line 33. Those skilled in the art will readily appreciate that a plurality of conductors are represented by the single lines of FIG. 1. The higher temperature water from the building (or other cooling load) is returned over line 34, cooled in the evaporator 28, and the chilled water is returned to the building over line 35.

An induction motor 36 is coupled over shaft 39 to the centrifugal compressor 20, and this motor 36 is itself driven from an inverter 37. The inverter receives a d-c input voltage over line 38, thus determining the amplitude of the inverter output voltage. A voltage control circuit 40 is provided between a voltage supply line 41 and line 38 which passes the voltage to the inverter. This can be a conventional circuit, such as a phase-controlled rectifier circuit, which receives an input a-c voltage on line 41 and provides a d-c voltage on line 38 which is regulated in accordance with the signal received over line 42. If no regulation is necessary, a d-c voltage can be supplied over line 38 to the inverter from batteries, a transformer-rectifier, or any suitable source. The frequency of the inverter output voltage is regulated by the periodicity of the timing signals, or gating signals, supplied over line 43 from a logic circuit 44. This is a well-known circuit which receives a regulating signal on line 45 and utilizes this regulating signal to govern the frequency of the pulses supplied on line 43. One well-recognized arrangement receives a d-c voltage as a control signal on line 45, and a voltage-controlled oscillator in the logic circuit 44 provides pulses at a frequency determined by the amplitude of the signal on line 45. The logic circuit generally includes a ring-counter type circuit to distribute the pulses to as many thyristors or other switches as are used in the inverter circuit.

In accordance with the present invention, the control system 50 is utilized to regulate not only the speed of induction motor 36 but also the physical position of the pre-rotation vanes 31, by a speed control signal supplied over line 51 and a vane position (drive open or drive closed) signal supplied over line 33. The circuit arrangement of the invention insures that surge is avoided, and that the compressor is regulated in the most energy-efficient manner. In this embodiment the speed control signal is a d-c voltage supplied from an integrating circuit 52, and the vane control signal can be either an "open vanes" signal on line 53 or a "close vanes" signal on line 54, or no signal ("hold vanes"). These output control signals are derived from different input signals, including a first signal on line 55 which is provided by a thermistor or other temperature sensing unit 56 positioned to contact the refrigerant in the condenser discharge line as shown. A second signal is provided on line 57, obtained from a second sensing means or thermistor 58 which is exposed to the saturated refrigerant vapor leaving the evaporator. The first and second signals are combined in a summation means 59, which can be a differential amplifier circuit, to provide a resultant signal on line 60 which connotes the head of the compressor. The circuit means in the control system which utilize this signal, and the other input signals, will be described hereinafter in connection with FIGS. 6A-6C. For the present it is important to emphasize that the provision of the compressor head information from this simple temperature difference determination is an important aspect of the present invention. Without appreciating that the compressor head is a virtually linear function of this temperature difference, more expensive pressure transducers would have to be positioned in or adjacent the compressor itself to provide some signal related to the compressor head. Accordingly the realization that the compressor head can be inferred in this manner is an important part of the inventive contribution.

A potentiometer 61 is shown with its movable arm or wiper mechanically coupled to the PRV, or to the output shaft of motor 32 which drives the PRV. Thus the electrical signal on line 62 indicates the physical position (fully open ¾ open, and so forth) of the inlet guide vanes in a continuous manner. Subsequently the circuitry will be described which combines this inlet guide vane position signal with the compressor-head-indicating signal to assist in regulating the compressor operation.

A third temperature sensing means, which can be another thermistor 63, is positioned to sense the temperature of the chilled water discharged from the evaporator 28. Thermistor 63 thus provides a third signal, which is applied over line 64 to another differential amplifier stage 65, which also receives a temperature set point signal from a potentiometer 66 or another suitable unit, such as a thermostat in the building space. Thus the output signal on line 67 represents the difference, if any, between the condition called for (denoted by the signal derived from component 66) and the instantaneous load condition (represented by the signal on line 64).

An unload control stage 68 is shown coupled to the movable arm of the potentiometer 66. For the purposes of this invention, stage 68 represents any means for limiting the consumption of electrical energy by changing the temperature set point, or effecting a different circuit adjustment, to change the load on the compressor and reduce the rate of energy consumption. Those skilled in the art will appreciate that this is similar to physically changing the thermostat setting, but in large installations this can be done automatically by a control system which monitors the rate of power consumption in successive time periods (such as half-hour intervals), and prevents the equipment from consuming more than a pre-set amount of power in each given time period.

Of the additional signal paths shown in FIG. 1, line 70 represents means for supplying a shut-down signal to the logic circuit 44 when an overload condition is sensed by the control system. To determine this, and other operating signals, a signal related to the amplitude of the current flowing through the windings of motor 36 is passed over line 71 to the control system, and another signal related to the motor speed is passed over line 72 to the control system. The motor current signal is derived from a current transformer in a well-known manner, and is not illustrated herein. The motor speed signal can be derived from a conventional tachometer (not shown), to provide a d-c voltage signal on line 72 which denotes the motor speed. It is not requisite to have an external set of conductors, as represented by line 72, to return a signal related to the motor speed. Instead the control system can use an internal line, tied to the output of stage 52 which provides the motor speed control regulating signal, and use a portion of this d-c speed signal to signify motor speed. With this general perspective of the complete refrigeration arrangement and the control system, a more detailed explanation will now be set out.

Figure 2:
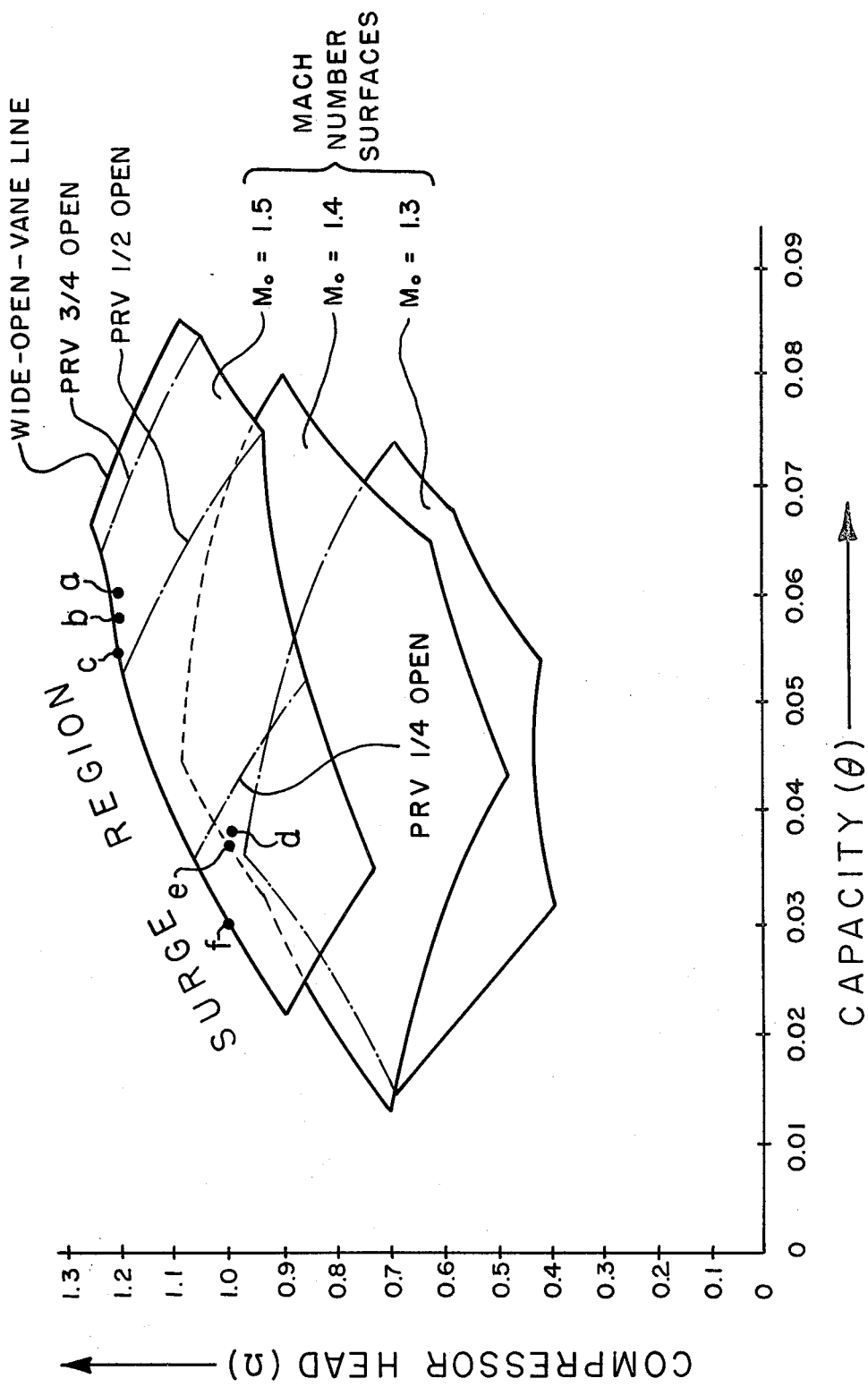
FIGS. 2, 3 and 4 are graphical illustrations useful in understanding operation of the invention.

FIG. 2 is a graphical illustration of operating characteristics of a conventional compressor, taken from test block data. The compressor head is shown plotted against flow (or capacity), characteristics that will be described in more detail in connection with FIG. 3. The three surfaces depicted on the graph of FIG. 2 represent regions of system operation at a constant Mach number or compressor speed. For example, the uppermost surface depicts the possible variations in head and the capacity while operating at a Mach number of 1.5. If the operating parameters change and go beyond the longer of the upper boundary lines for the 1.5 surface, the surge region is entered, indicating the system will be unstable and the compressor will surge. The upper right line termination of this 1.5 surface represents operation with wide open vanes, and the three dash-dot lines are used to indicate the regions of operating at $\frac{3}{4}$ open vanes, $\frac{1}{2}$ open vanes and $\frac{1}{4}$ open vanes. These regions are depicted as discrete lines but the system can be continuously adjusted over the entire vane-opening range, affording operation at any vane opening. For operating at a lower speed or Mach number of 1.4, the system "drops down" to the intermediate surface depicted in FIG. 2. Similarly, with a further reduction of operation to a 1.3 Mach number, the system drops down to the lowest of the three surfaces illustrated. It is also understood that in a system in which the compressor speed is continually adjustable, the Mach number changes are not made in large increments as shown, but the adjustment is continuous in the "space" between the surfaces depicted in FIG. 2 as the compressor speed is reduced. With this perspective of the compressor head-flow for regions of constant speed, a description of the compressor characteristics in another format will now be set out.

Figure 3:
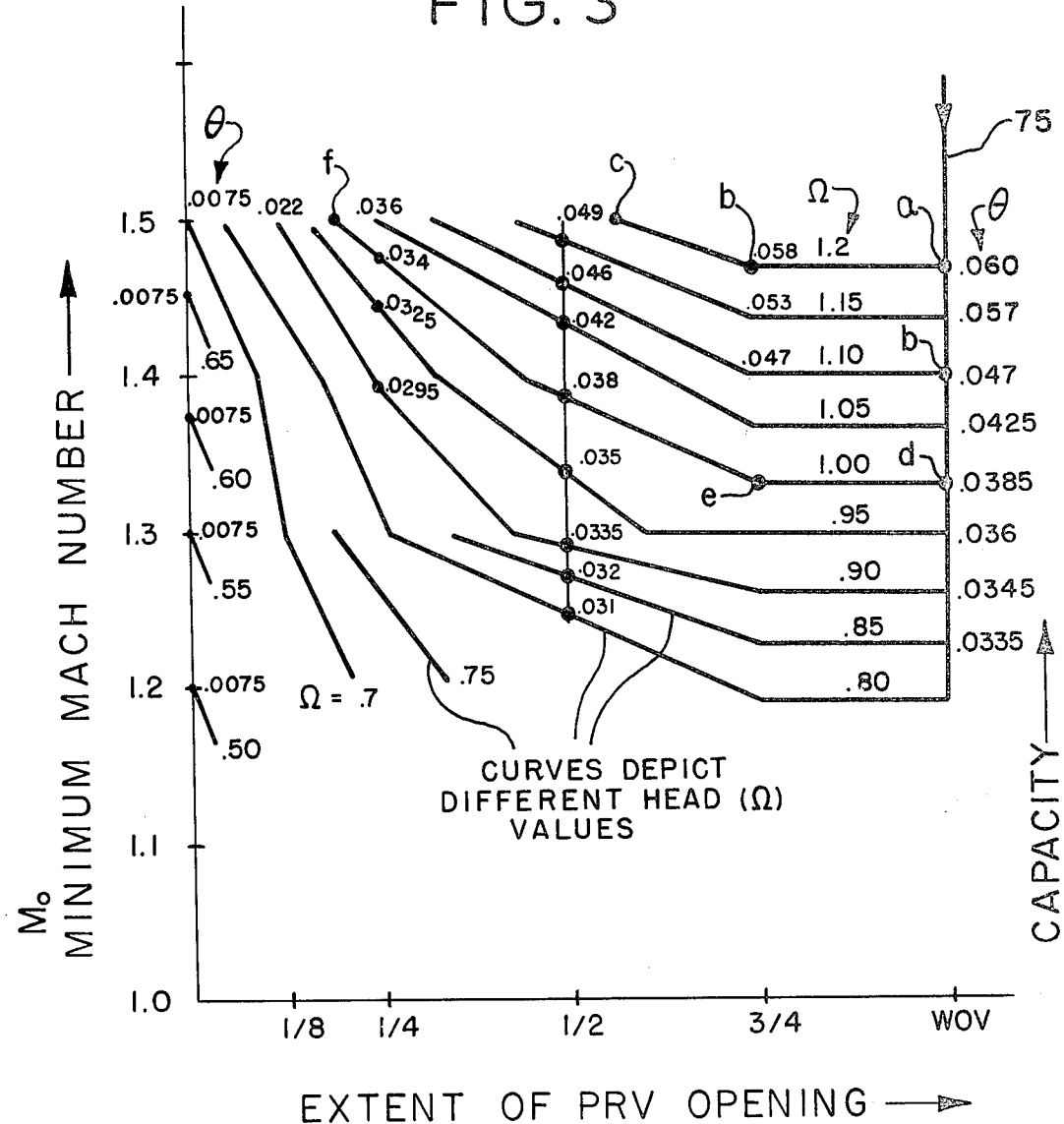

FIG. 3 is a graph illustrating the "minimum Mach number" $M_o$ along the left ordinate, the extent of the PRV opening along the abcissa, and the compressor capacity $\theta$, specified at selected points, all related to the compressor head $\Omega$ which is depicted by the series of curves shown on the graph. The "minimum Mach number" $M_o$ can be considered to represent the motor speed. More accurately, it is the ratio of the impeller tip speed to the suction stagnation acoustic velocity (this velocity is hereinafter termed "A"). Because the induction motor is coupled to the compressor, the motor speed can be considered directly related to the impeller tip speed. For this analysis it is assumed that A, for a given refrigerant, does not change significantly over the typical operating range of the evaporator, and hence $M_o$ can be considered a function of the motor speed alone. The PRV opening is represented in increments from fully closed to the wide open vane (WOV) condition. The capacity, depicted as $\theta$, is technically the ratio of the suction (in cfm) times 2.4, and this term is divided by the product of A times the square of the impeller diameter. The compressor head $\Omega$, represented by the curves in FIG. 3, is technically the measurement of the head (in feet) times the constant 32.2, and this product is divided by $A^2$. Because A is considered not to change significantly, as noted above, it simplifies the consideration of the capacity $\theta$ and the compressor head value $\Omega$.

Each of the different curves in FIG. 3 represents a constant head value $\Omega$, and the minimum speed and PRV necessary to accommodate a given capacity without entering a surge region. For example the curve in the upper right portion with a head value of 1.2 indicates the motor speed and PRV opening changes which must be made to reduce the capacity at this head value. The arrow 75 shows the direction of decreasing capacity, and if only the motor speed (and thus the compressor speed) is reduced, the capacity is reduced as shown by the decreasing value of $\theta$ along the right side of the graph. However if the speed is reduced to the point referenced a, and it is still desired to further reduce the capacity without decreasing the compressor head below 1.2, at this point the motor speed must be maintained constant and the PRV gradually started to close, thus reducing capacity as indicated to the point b, where the value of $\theta$ is 0.058 and the vanes are approximately $\frac{3}{4}$ open. The system will surge if, at point b, the speed more further reduced. It is important to note that for a further capacity reduction at the same head, the vane closure continues but the motor speed must now be increased, up to the point marked c.

In a similar manner, if the head value is 1.0, the vanes can be maintained wide open while the speed is decreased down to the value where $\theta$ equals 0.0385, at reference point d. From this point the speed is maintained constant and the vanes are gradually closed down, until they are about $\frac{3}{4}$ open as shown at the point e. Hereafter the motor speed is again gradually increased while the vane closure is continued, to the point marked f. The points a–f are also shown on FIG. 2. Thus it is apparent that a complex control function is required to coordinate regulation of both the compressor speed (by regulating motor speed) and the opening of the PRV. The load line for a given system, when drawn on FIG. 3, would cut across the different head curves. Thus it is necessary to consider the change in head, as well as the present position of the PRV and the instantaneous motor speed, whenever a change is made in the system, to be certain that surge is avoided and the most efficient operation is achieved.

Figure 4:
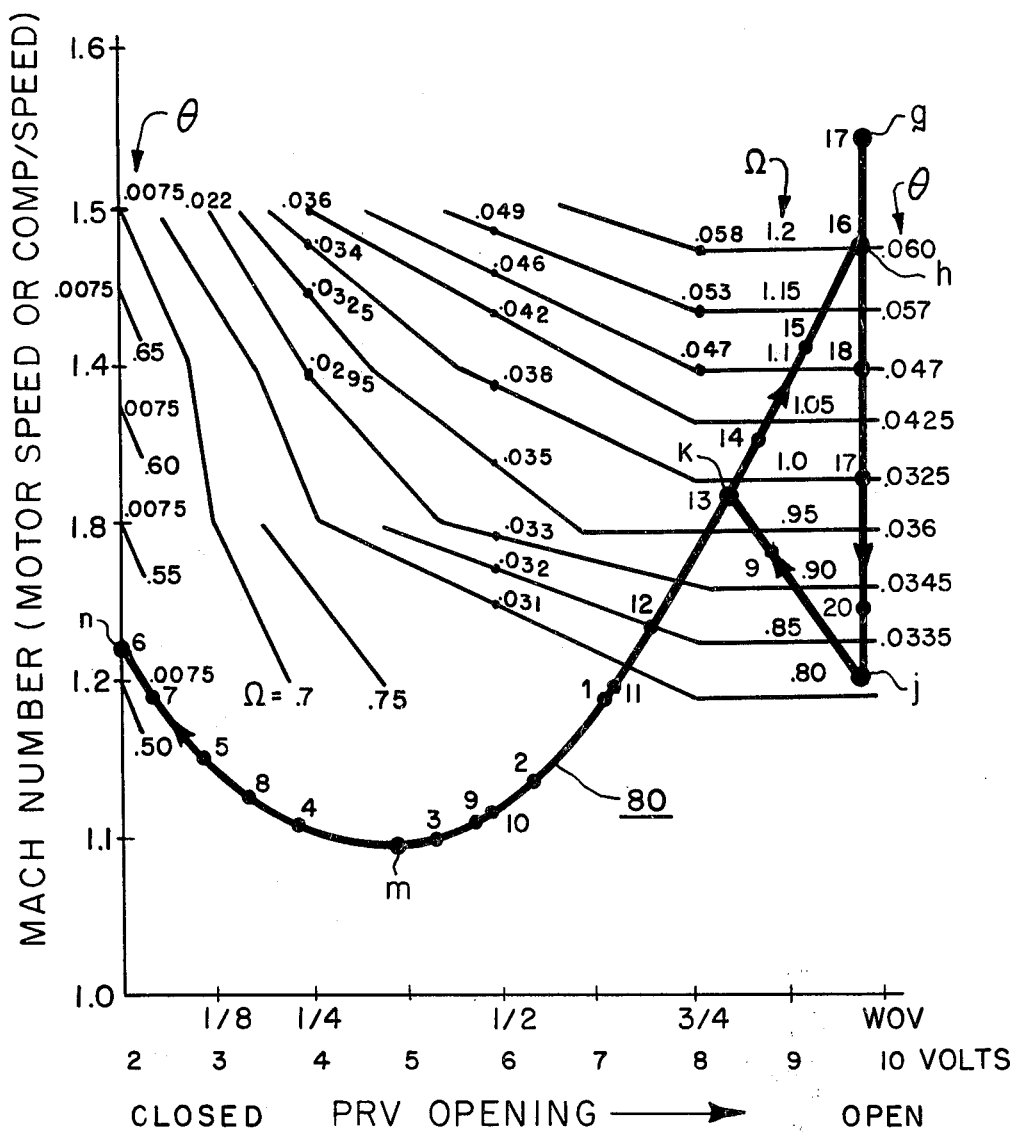

The control path for combining motor speed control and PRV opening control, found effective in achieving such regulation without going into surge, is depicted by the curve 80 in FIG. 4. The constant-head $\Omega$ curves are shown as background for the ideal control path 80. Suppose that the system is originally operating at full capacity with wide open vanes; this is represented at the point designated g. When it is desired to decrease the load, the capacity is reduced by reducing the motor speed, following the curve which passes through point h and eventually straight down to point j, at which time the control algorithm must be modified to include adjustment of the PRV position to maintain the optimum control path. The vanes are then gradually closed to about an 80% open position, while the motor speed is increased from the level indicated at j to that represented at the point k. From this point the vane closure is continued, but the motor speed is again reduced, until the control path 80 reaches the nadir at point m. At this part of the curve the vanes are about 35% open, and as the vane closure is continued, the speed is then increased up to the point n.

When it is desired to increase the load, considering the system is now operating under conditions represented at the point n, the PRV opening is gradually increased while the motor speed is decreased, until the point m is reached. Thereafter, as the vane opening continues, the motor speed is increased up to the point k. In accordance with an important aspect of this invention, the motor speed increase is continued, as the vanes are further opened, along the segment kh of the control curve; the other two legs, kj and jh, are not followed in restoring load. Instead the control path is directly from k to h, and then up to g after the vanes are fully opened.

Because it has been determined that this path avoids surge and achieves a very high operating efficiency, it is important that the control system "know" not only the amount of change required, but the direction in which the change is being effected. This requires both combinational logic and stored information regarding compressor performance in the control system, as will be described, to achieve the optimum control path 80 depicted in FIG. 4.

Figure 5:
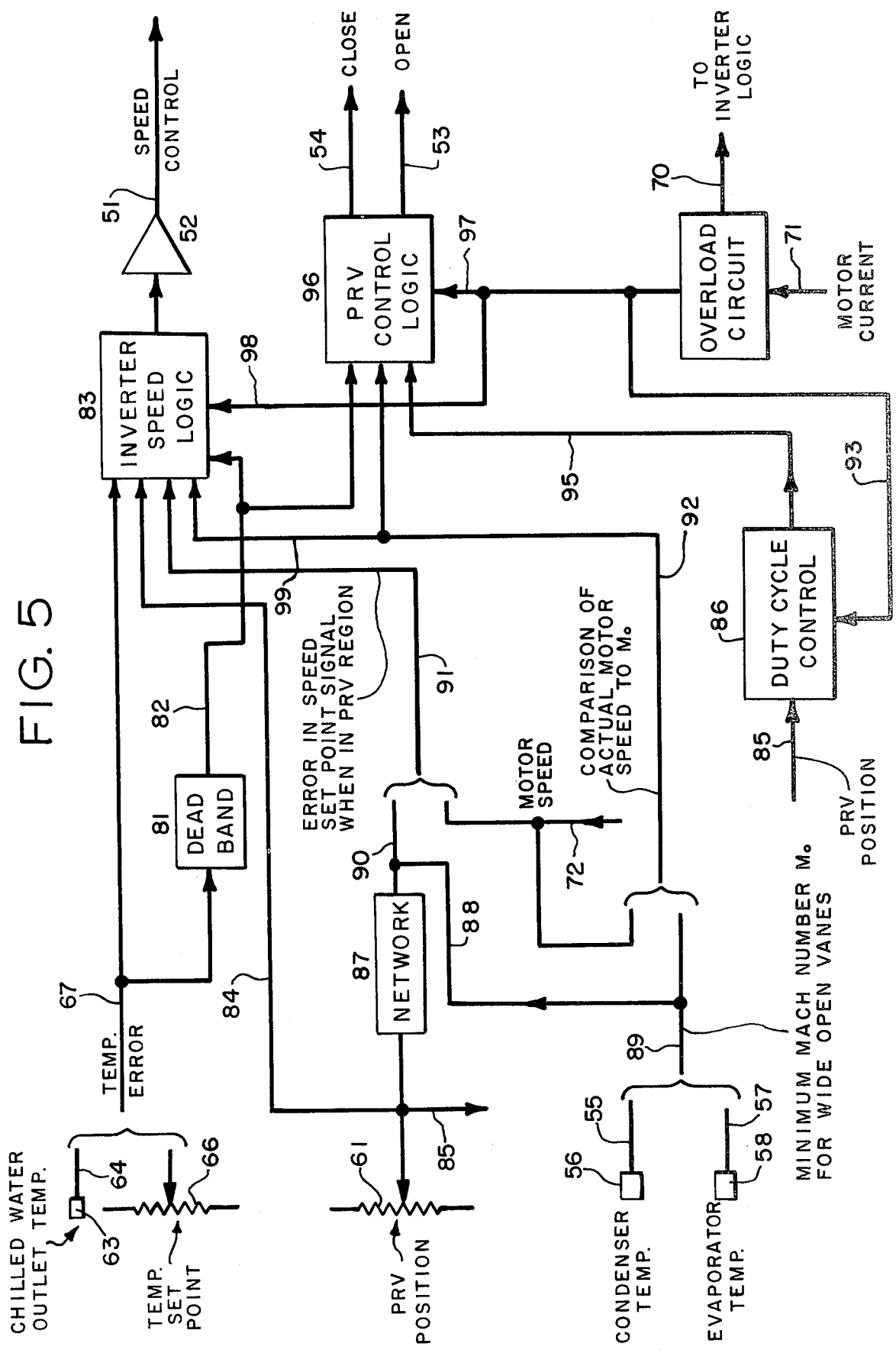
FIG. 5 is a diagram showing the principal signal paths in the control system of the invention.
Figure 6A:
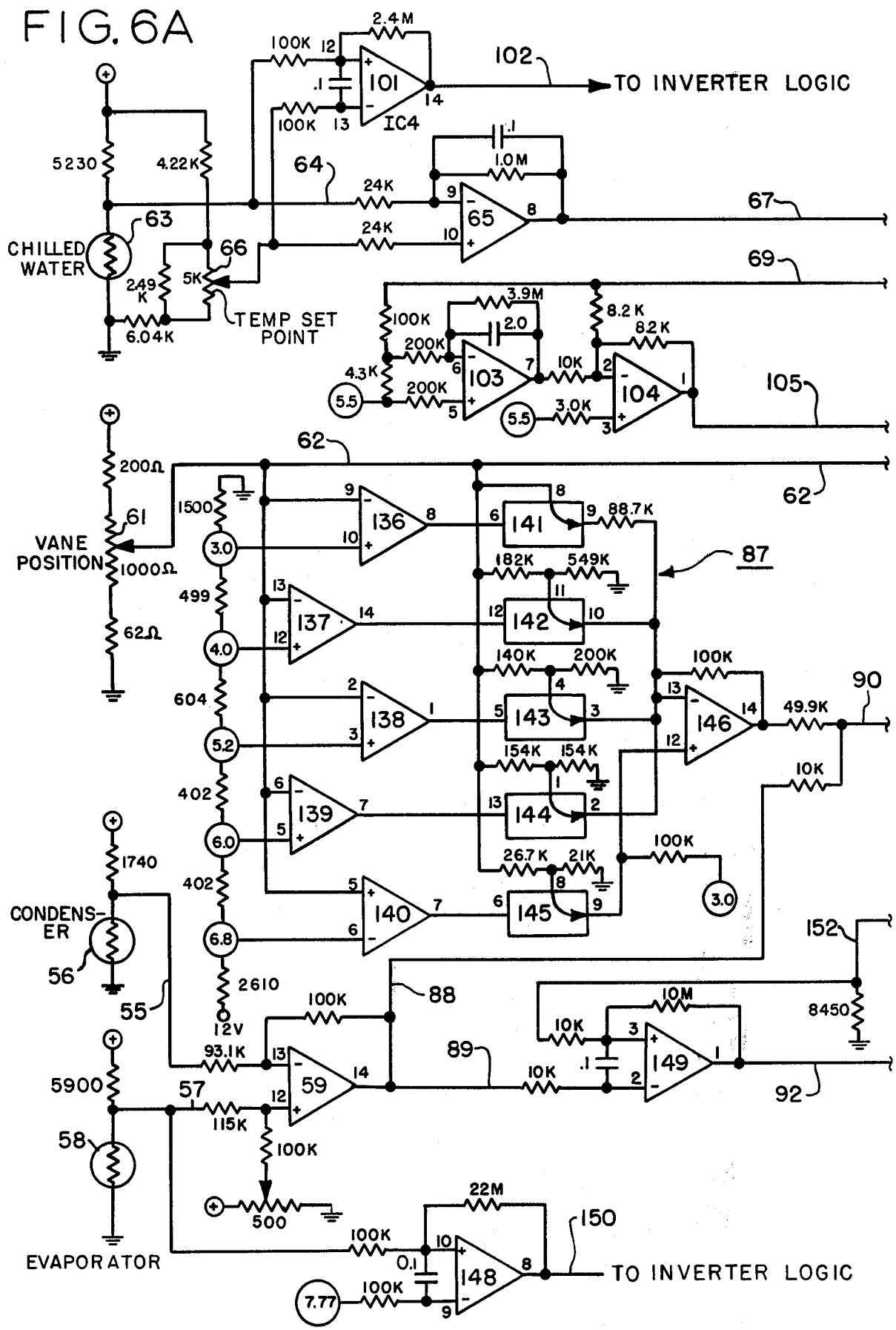
FIGS. 6A, 6B and 6C are schematic diagrams which, taken together, illustrate the circuit details of the control system of this invention.
Figure 6B:
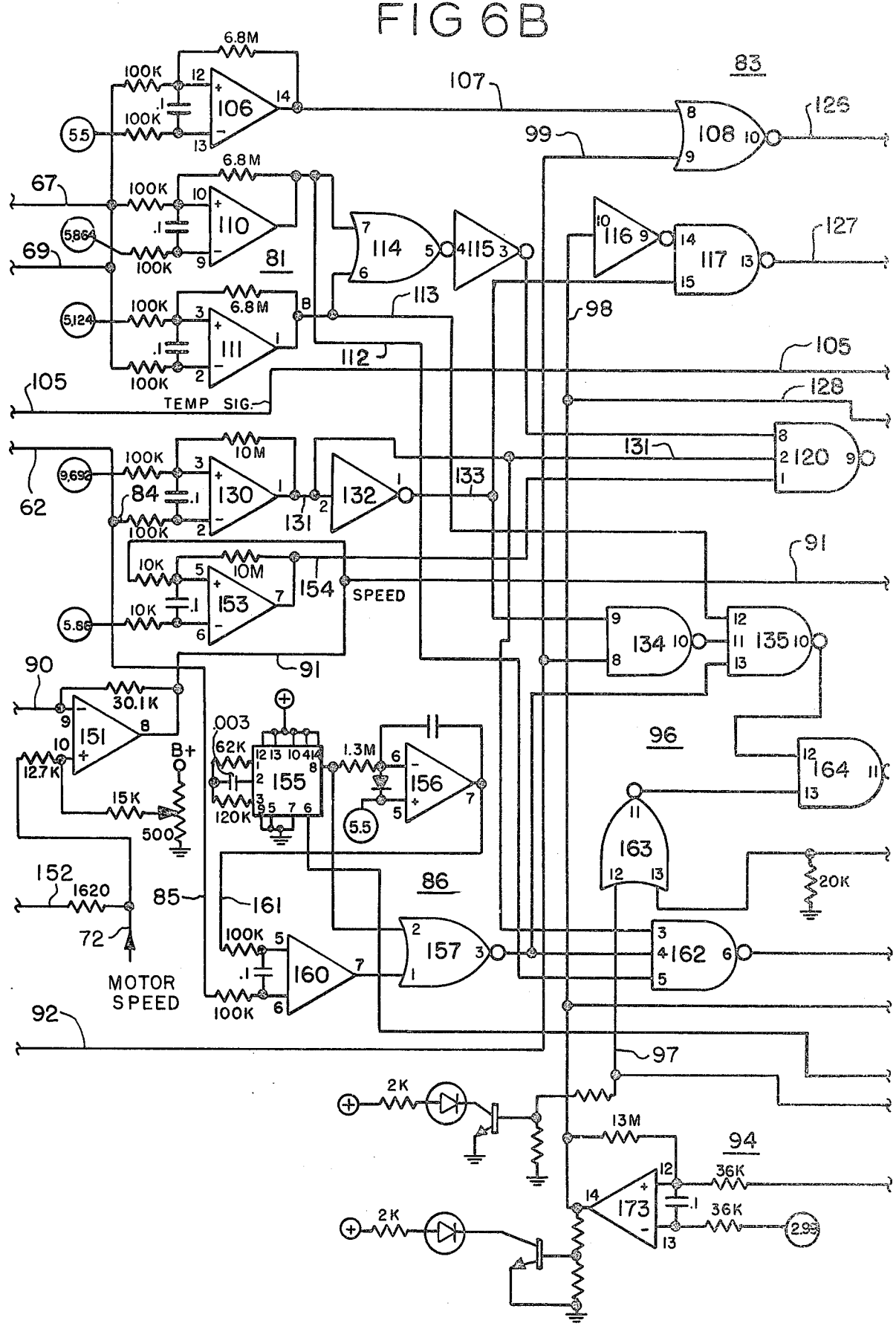
Figure 6C:
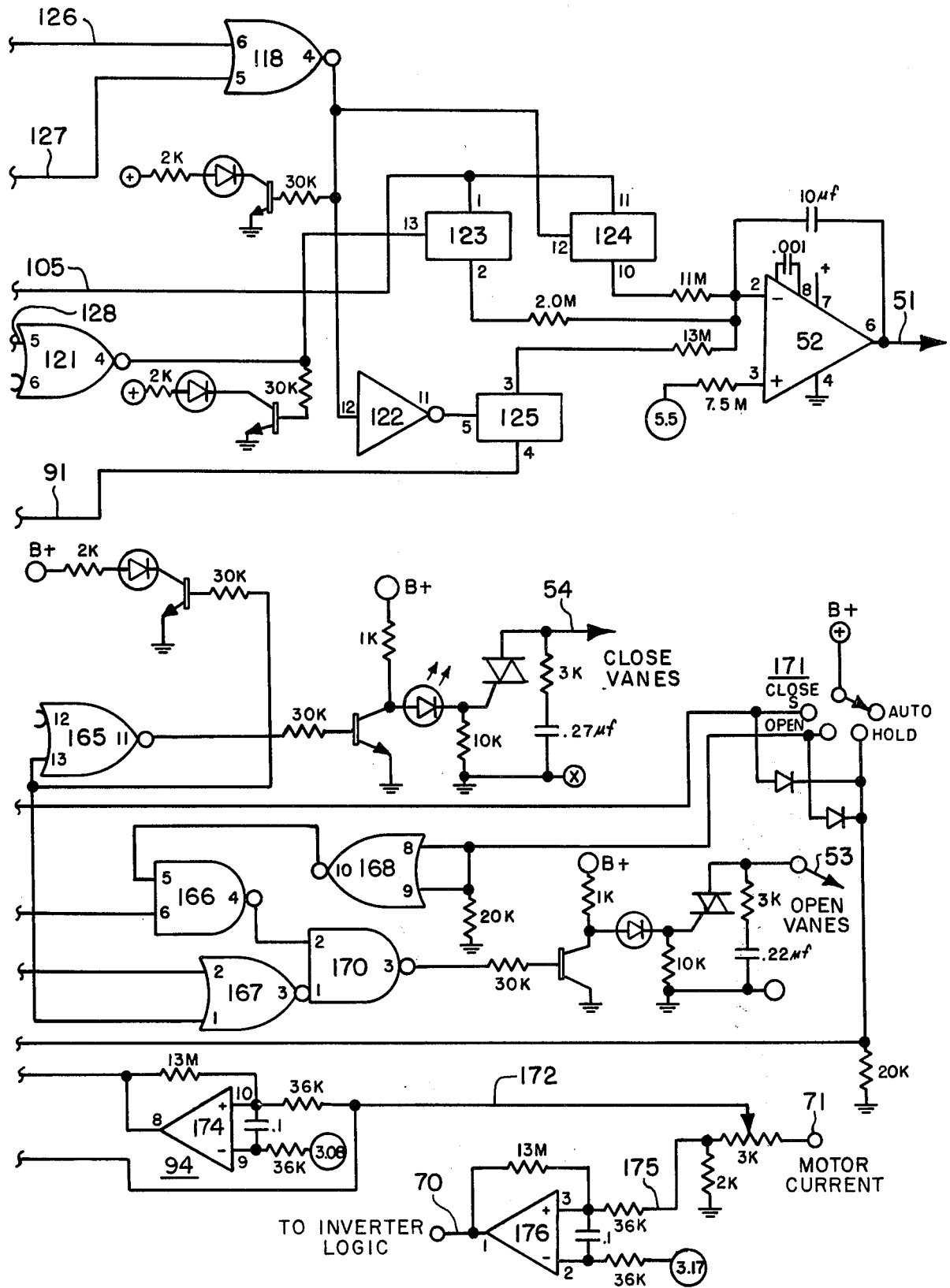

FIG. 5 is an illustrative diagram setting out general signal flows of the more detailed circuits depicted in FIGS. 6A, 6B and 6C. In general the chilled water outlet signal from thermistor 63 (FIG. 5), and the temperature set point signal, derived either from the potentiometer 66 or from any other means for establishing the desired temperature control level, are combined to produce a temperature error signal on line 67. A "deadband" network 81 is provided to produce separate output signals on line 82 (which represents a plurality of conductors), to avoid giving switching commands to the PRV control logic circuit 96, and to the inverter speed logic circuit 83 when operating in the PRV control region, until the temperature error signal has exceeded the amount determined by the dead band. The output of the logic arrangement 83 is passed through integrating stage 52 to provide on line 51 the motor speed control signal, to regulate the inverter operating frequency and hence the motor and compressor speeds.

The vane position information of the PRV is taken from potentiometer 61 and, over line 84, a portion of this signal is applied to the inverter speed logic circuit 83. Another part of the PRV position signal is passed over line 85 to a duty cycle control circuit 86. In addition the PRV position signal is passed through a network 87 and combined with the minimum Mach number $M_o$ signal on line 88. As described previously, this minimum Mach number for wide open vanes is derived from the condensing temperature as sensed by thermistor 56, and the evaporating temperature as sensed by the thermistor 58. These two signals are combined to provide the minimum Mach number $M_o$ signal (for wide open vanes) on line 89. When this signal is passed over line 88 and combined with the output of network 87, it provides a composite signal on line 90 which is then combined with the actual motor speed signal received over line 72 to produce an error signal on line 91. This error signal is the error in speed set point when the system is controlling the PRV position, in addition to regulating the motor speed. The motor speed signal is also compared with the $M_o$ signal on line 89 to produce on line 92 a logical signal indicating whether the actual motor speed is above or below $M_o$. This signal is then applied to the PRV control logic circuit 96 and, over line 99, to the inverter speed logic arrangement 83.

The duty cycle control circuit receives both the PRV position control signal over line 85 and, over line 93, another signal from an overload circuit 94. The output of circuit 86 is passed over line 95 to the PRV control logic circuit 96, which determines whether the vane position should be changed, the direction in which the vanes should be moved, and the amount of movement which should occur. The overload circuit 94 receives a signal over line 71 proportional to motor current and, in addition to providing a signal on line 93 to the duty cycle control circuit 96, provides another signal over line 97 to the PRV control logic circuit 96, and another signal over line 98 to the inverter speed logic control circuit 83. With this general perspective of the system, those skilled in the art will more readily correlate the showing in FIGS. 6A-6C with the entire apparatus arrangement depicted in FIG. 1.

In the showing of FIGS. 6A-6C, the chilled water outlet water temperature was derived from thermistor 63 and passed over line 64 and one of the 24K resistors to one input terminal of the differential amplifier 65. The signal from the set point potentiometer 66 is passed over the other 24K resistor to the other input connection of stage 65, providing the temperature error signal on the output line 67. To assist those skilled in the art the IC component identifications are given hereinafter, and the operating voltages of the different stages are shown in a circle. The +sign in a circle indicates the B+ voltage of 12 volts is applied to that point. The chilled water temperature and set point signals are also combined in another comparator stage 101, to provide a signal on line 102 to the inverter logic when a low-water temperature condition is sensed. The application of this signal, and other overload signals, are not shown in the logic circuit, but those skilled in the art will readily understand the application of this signal to shut down the inverter operation when the chilled water temperature is too low.

The stages 103 and 104 are connected in a lead-lag compensation circuit for the system. This network provides a phase lead at 0.007 hertz and a phase lag at 0.02 hertz. Thus the error signal on line 67 passes over line 69 to this network, so that the output signal of the network on line 105 is a compensated temperature signal for application to the inverter speed logic arrangement.

The signal on line 67 is passed through another comparator circuit 106 to provide on line 107 a logic signal, which is a logical 1 (or high voltage) when the chilled water outlet temperature is greater than the set point temperature, and is a logical zero (low voltage) when the chilled water temperature is less than the set point temperature. This is applied to one input connection of the NOR gate 108 as shown. Stages 110 and 111 are connected to provide logic signals on lines 112, 113 when the difference between the set point temperature and the chilled water temperature exceeds the amount of the dead band, or the dead zone. In the illustrated embodiment, the dead zone was set to include a temperature difference of ±0.15° F., electrically represented by the difference between 5.12 volts and 5.86 volts applied to the two stages 111 and 110. A reference or center-band voltage of 5.5 volts is utilized as the reference. NOR stage 114 and an inverter stage 115 are connected as shown to provide a logic signal for use in the inverter speed logic control circuit. These stages, and the additional stages 116, 117, 118, 120 and 121 will be identified at the end of this description to enable those skilled in the art to use the invention with a minimum of experimentation. In addition another inverter 122 and the gates 123, 124 and 125 which regulate the application of signals to the integrating stage 52, will also be identified.

The signal from the PRV position potentiometer 61 is derived and supplied on line 62 as shown. A portion of the signal is supplied over line 84 to one connection of a comparator stage 130 which also receives a d-c reference signal at its other input connection. The wiper of potentiometer 61 is at the zero resistance (top) position in the wide open vane condition. This setting, and the other circuit components and voltages shown in the drawing, cooperate to produce a logical one signal on conductor 131 at the output side of stage 130, when the inlet guide vanes are in the wide open position. The signal becomes a logical zero when the vane opening is reduced from the wide open vane condition. The signal is applied to one input connection of the NAND gate 120, and is also inverted in the inverter stage 132. The inverted signal is passed over line 133 to the NAND gate 117 and to the NAND gate 134, the output of which provides one input to the NAND gate 135 in the PRV control logic circuit 96.

The vane position signal on line 62 is also supplied to the negative input connection of each of the comparator stages 136–140. The outputs of these comparators are respectively coupled to the gate circuits 141–145, as shown. These outputs from the gates are summed in stage 146 to provide a signal indicating the speed deviation from the minimum Mach number based on the actual vane position.

The refrigerant condensing temperature sensed by thermistor 56 provides a signal on line 55, and the refrigerant evaporating temperature sensed by thermistor 58 provides another signal on line 57. These two signals are combined in differential amplifier 59 to provide on lines 88 and 89 a signal related to the minimum Mach number $M_o$ for wide open vanes. At this point in the circuit the signal is related only to the compressor head, and does not include any factor related to the vane position. A portion of the evaporator signal on line 57 is passed to another comparator 148, to provide on line 150 a shut-down signal for the inverter logic when the evaporator temperature drops below a pre-set value, which value is established by the reference voltage applied to the other input connection of this stage.

The $M_o$ signal on line 88 is combined with the speed change signal at point 90, and applied to the negative input connection of op amp 151. Thus this connection receives a composite input signal which is a function both of the speed change signal and the minimum Mach number $M_o$. The other input connection of stage 151 receives an actual motor speed indicating signal over line 72, as described previously. Thus the output signal from stage 151 which is provided on line 91 to the inverter speed logic arrangement represents the error in the speed set point signal when the refrigeration system is operating in the PRV control region, where both the motor speed and the vane position must be regulated to follow the optimum control path 80 depicted in FIG. 3.

In FIG. 6B, the speed signal on line 91 is also applied to the +input connection of another comparator 153, which receives a reference voltage at its other input connection. Thus the output from stage 153 is a logic signal, passed over line 154 to the NAND circuit 120, signifying whether the actual motor speed is above or below the desired motor speed for the given operating conditions. In brief this logic signal is used to allow temperature error information to modify the motor speed control command and obtain faster system response, when such modification does not pose the danger of sending the system into surge.

The duty cycle control circuit 86 operates to limit the time of contact closure in the drive-open and drive-closed portions of the PRV control, as a function of the instantaneous PRV position. This is an important aspect of the present invention, because, when the vanes are closed down to leave only a small opening, it prevents a "drive closed" signal from being applied at a rate faster than the system response rate. The duty cycle control circuit 86 can also be considered a drive control circuit, in that it determines the percentage of the time, in a given time interval, that a drive signal is actually applied to the PRV motor 32, or to any suitable capacity control means which is adjustable to vary the capacity of the compressor. Hence PRV motor 32 is a means for regulating the adjustable capacity control means, the PRV themselves.

Figure 7:
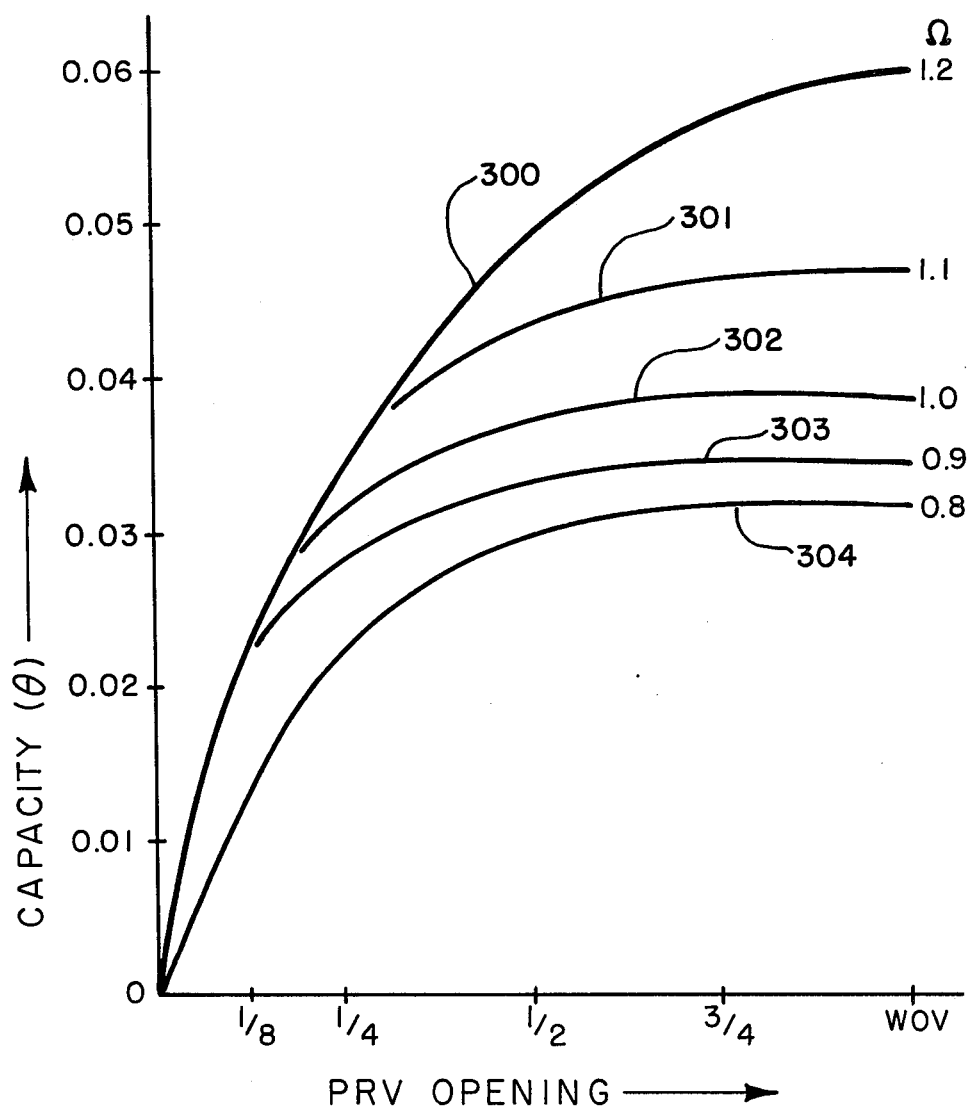
FIG. 7 is a graph depicting the relationship of compressor capacity to PRV opening for different head values.

The problem posed by previous PRV control systems can be better understood in connection with FIG. 7. The several curves there shown illustrate variations in compressor capacity as a function of the PRV opening, for different constant values of head ($\Omega$). For example the curve 300 indicates the capacity-vane-opening relationship for a compressor head value of 1.2. The succeeding curves 301, 302, 303 and 304 depict decreased values of compressor head, down to an $\Omega$ of 0.8 for curve 304. As the compressor head drops to 1.0 and values below that level, the slope of the curve portions to the right of a PRV opening of about ½ become increasingly smaller. However for low values of PRV opening, irrespective of the head value, the slopes of the curves are very great. Thus it is manifest that a very slight physical displacement of the inlet guide vanes, when the vanes are closed or almost closed, effects a very large change in the system capacity. It would be desirable if the curve shown in FIG. 7 where more linear, and it is toward a linearization of the system operation that the duty cycle control circuit 86 is directed.

The duty cycle control circuit or drive control circuit 86 (FIG. 6B) basically comprises an integrator stage 156, a NOR gate 157, and a comparator stage 160. This drive control circuit receives two different input signals. A first input of the drive control circuit can be considered conductor 200, which receives a timing signal from the oscillator 155. This timing signal, at 0.033 hertz in the illustrated embodiment, is applied over the 1.3M resistor to the upper input terminal of integrator stage 156, and is also applied to the upper input terminal of NOR gate 157. This signal is represented generally by the waveform 201 in FIG. 8A. NOR gate 157 will provide a logical 1 output signal when both inputs are low, or 0. When the oscillator signal represented by the waveform 201 goes low, the 5.5 volts reference voltage on the other input terminal of integrator 156 allows this stage to begin charging at time $t_o$, and produces an output voltage such as 202

(FIG. 8B) over line 161 to the upper input terminal of comparator 160. This comparator also receives a position signal over line 85; this position signal varies as a function of the setting of the adjustable capacity control means, which in this embodiment is the PRV of the compressor. When the PRV is virtually fully closed, the d-c voltage level on line 85 is approximately 2 volts, represented by the line 203 in FIG. 8B. When the increasing signal from integrator 156 over line 161 intersects the 2 volt line at point A, comparator 160 switches at time $t_1$, represented by waveform 204 (FIG. 8C). Thus for the time between $t_o$ and $t_1$, the signal from comparator 160 was low, and the signal depicted by curve 201 (FIG. 8A) from the integrator 156 was also low. Hence the output of NOR gate 157 was high at this time, as shown by the pulse near the beginning of curve 205 in FIG. 8D. So long as the comparator output remains high, shown by curve 204, there is no further output from the NOR gate 157. The signal 204 goes low again when the decreasing slope of curve 202 intersects the 2 volt line, at time $t_5$. However at this time the oscillator output is high, and hence there is no further output from NOR gate 157 until the increasing-slope portion of the integrator curve 202 again intersects the 2-volt line 203. Thus the drive signal to the PRV, or to the means for regulating the adjustable capacity control means, is clearly a function of the vane position, represented by the level of the signal on input line 85.

Supposing that the PRV are virtually wide open, a 10 volt signal is provided over line 85; this signal is represented by the line 206 in FIG. 8B. It is thus apparent the increasing-slope portion of curve 202 will intersect the 10 volt line at point B, or at time $t_3$ shown in curve 207 of FIG. 8E. At this time the output of comparator 160 goes high, as shown on curve 207, preventing any output from NOR gate 157. However prior to that switching, between times $t_o$ and $t_3$ as shown on curve 208 in FIG. 8F, the output of NOR gate 157 was high becuase both inputs to this gate were low. This provides a much longer duration pulse in the curve 208 for driving the PRV or any other adjustable capacity means. In the illustrated embodiment, the circuit components provided a pulse of approximately 1 second on the waveform 205, and approximately 5 seconds in the waveform 208. Intermediate positions of the PRV provide corresponding intermediate pulse lengths. Of course other drive control circuits could be employed to provide a variation of some other signal characteristic, such as amplitude, to regulate the change in the adjustable capacity control means in accordance with the instantaneous position of the adjustable capacity control means.

The capacity control signal is passed from NOR gate 157 into the NAND gate 162, and also passed upwardly into the other NAND gate 135. The operation of the logic arrangement for driving the vanes open or closed is achieved with the additional stages 163-168, and 170, connected as shown.

For example, a logical zero signal from NOR gate 165 (FIG. 6C) provides no gate drive for the NPN-type transistor, energizing the light-emitting diode from B+ and the 1K resistor, and providing gate drive to the thyristor, which is energized and provides a close-vane signal on line 54. The terminal below the 0.27 microfarad capacitor, marked X, corresponding to the other similarly marked terminal in the open-vane circuit, represents a common electrical connection for the PRV motor. Of course, the system can be manually operated by displacing the mode selector switch 171 from the automatic position, in which it is illustrated, to either of the other three positions. When the movable contact is displaced to engage the "hold" contact, then the vane motor cannot be driven open or closed but remains in the present position. When displaced to contact the "open" contact, an energizing circuit is completed to gate on the thyristor and provide a signal on line 53 to open the vanes. Similarly when the switch is further displaced to engage the "close" contact, operation of the logic circuit provides the gate drive signal necessary to energize the thyristor and provide the close-vane signal on line 54.

The motor current level signal is received over conductor 71 and divided over the illustrated 3K potentiometer, with a portion of this signal being diverted over line 172 to the first current limit stage 174. When the level of the motor current reaches a previously determined value representing 100% of the current rating, stage 173 switches and provides an output signal which is passed both to the PRV logic control circuit and to the inverter speed logic control circuit as illustrated. In the inverter speed control portion, this means that the inverter motor cannot be driven any faster while this 100% current level is maintained, and the speed will in fact be reduced. In addition, the operation of the PRV logic control circuit under these conditions is such that the vanes cannot be driven open, but when a decrease-load signal is provided, the vanes can be driven closed to reduce the loading on the system. If the current level increases further, to a level indicating 103% of the rated current is flowing in the motor windings, stage 174 is switched to provide a signal to the PRV logic control circuit which begins to drive the vanes toward the closed position, to reduce the load. If the current increases further to the level of 106% of rated current, this signal is sensed over line 175 and stage 176 switches to provide on line 70 a signal which shuts down the inverter logic and thus correspondingly removes the motor energization.

FIG. 9 illustrates a pair of curves depicting the variation of compressor speed as a function of the opening of the PRV, for a fixed compressor head value. Curve 307 depicts a surge curve line developed from actual data, so that operation in the lower left portion of this curve would cause compressor surge. To avoid encountering surge, an actual functional 308 was derived, representing a mathmatical function to regulate operation of the control system of this invention. By regulating the speed of the electrical prime mover 36 and the extent of opening of the PRV to follow the functional 308, not only is surged avoided, but the system is operated in substantially the most energy efficient manner. That the control system can regulate operation along curve 308 is due in part to the effective derivation of the minimum Mach number $M_o$ on line 89 (FIG. 5) from the condensing and evaporating temperatures. Thereafter this minimum Mach number, or head-indicating signal, is passed to the output side of network 87. The signal derived from PRV position potentiometer 61 is modified by the network 87 to produce a modified or functional signal for combination with the minimum Mach number signal on line 90. This combination of signals on line 90 produces a signal which is then combined with the actual motor speed signal on line 72 to produce a "speed boost" signal for the inverter speed control portion of the control system. The term "speed boost" refers to the speed correction desired for the induction motor driving the compressor, considering the minimum Mach number $M_o$, the functional signal at the output side of network 87, and the actual motor speed signal. The resultant speed boost signal provides an efficient corrective value for regulating the induction motor speed in an optimum manner.

TECHNICAL ADVANTAGES

The present invention provides effective control for refrigeration systems using compressors having adjustable inlet guide vanes, in which the compressor is driven by a variable speed electrical motor. The system and method of the invention were successfully tested, and proved that automatic adjustment of compressor speed and the inlet guide vane position could match the compressor head and flow requirements for a given evaporator load, while maintaining the chilled water at a constant temperature. The path of control, as shown in FIG. 4, tends to minimize system energy requirements while at the same time avoiding compressor surge. In addition the control system and the control method of this invention have shown a capability of maintaining the chilled water within 0.15° F. of its set point, throughout the entire feasible load range. In particular the maximum possible use of motor speed control is effected, before beginning to adjust the PRV position to vary the compressor load. This is the most energy-efficient method for operating an arrangement with adjustable inlet guide vanes, and has proved significantly more efficient than systems using a combination of PRV control and hot gas bypass to prevent surge. Th present arrangement has eliminated the need for a gear box, and allowed operation with smaller, more efficient, higher speed motors. In addition the compressor is quieter at part load operation, it is driven more slowly, at a vane angle more suited to noise reduction.

The invention is in part based on the appreciation of the compressor characteristics, and the derivation of the minimum Mach number $M_o$, which is limited by the head on the compressor. This use of the Mach number for wide open vanes is continually monitored in the control system, to match the load requirements to the capacity of the compressor at that time. It is very important that the maximum range of speed control be utilized, before switching to the region of PRV control as described in connection with FIG. 4. The derivation of the head information from the two temperatures is a significant aspect of the invention. This provides accurate control with minimum transducer cost, because thermistors can be used in place of the more expensive pressure sensors frequently used in such arrangements.

The system and method of the invention regulates the refrigeration system in both the "speed control" region and in the "PRV control" region. In the speed control region, the concept of control is simply to adjust compressor speed by regulating the frequency of the inverter output voltage either up or down, depending on whether system capacity needs to be increased or decreased. The error in chilled water temperature, with respect to the set point, is used to define needed system capacity changes. The technique is easily understood and, after defining the response, stability, and loop compensation requirements, can be readily implemented with low cost electronic circuitry. In the PRV control region, chilled water error changes require a more complicated set of control changes and continuous monitoring of system variables. Not only does the PRV position need to be adjusted, but in order to avoid surge, the compressor speed must be concomitantly regulated according to head measurements and a pre-stored function of PRV position (network 87). Superimposed on these two regions of control characteristic, and its attendant boundary definition problem, is the requirement that the path of control chosen for compressor speed and PRV position adjustment must be energy conservative.

In the method and system of the invention, the observation that the compressor head is a nearly linear function of the difference between the refrigerant condensing and evaporating temperatures was of prime importance. Furthermore, experimental data on the compressor used demonstrated that the minimum allowable Mach number, to avoid surge, was linearly related to compressor head. Thereafter it was discovered that compressor head, in combination with the PRV position, could be used to define surge locii of the compressor at part vanes as well as at wide open vanes, and thereby produce the desired system operating path shown in FIG. 4. Thus signals from relatively low cost transducers, indicating condensing and evaporating temperatures, compressor speed, and PRV position, together with the chilled water temperature, form the basis for the effective control system and method of this invention.

The method of system control can be readily understood in connection with FIG. 5. In the method, the compressor head signal is continually established as a function of the condensing refrigerant and evaporating refrigerant temperatures; this head signal appears on line 89. A functional signal, related to the instantaneous position of the inlet guide vanes, is derived at the output side of network 87. The head-indicating signal and the functional signal are then combined to produce an intermediate signal on line 90. A signal related to the actual motor speed is provided on line 72; this can come from the motor, or from line 51, or some other source. The actual motor speed signal and the intermediate signal are combined to provide a first signal, on line 91, for use in regulating the speed of the compressor drive motor. A temperature error signal, related to the difference in temperature between the cooling medium at the evaporator outlet and the desired temperature set point, is produced on line 67, and the temperature error signal is used as a second signal for regulating both the speed of the compressor drive motor and the position of the inlet guide vanes.

Another way of understanding the method of the invention is in connection with FIG. 4. As there shown, the system is considered to be initially operating at a first operating condition, referenced g. Then the compressor drive motor speed is reduced, while the inlet guide vanes are kept wide open, from the first operating condition (g) through a second operating condition (h) to a third operating condition (j). Then a gradual closing of the inlet guide vanes begins, and simultaneously the compressor drive motor speed is increased, to reach a fourth operating condition (k), Closure of the inlet guide vanes is continued while the drive motor speed is simultaneously reduced, to reach the fifth operating condition (m). Closure of the inlet guide vanes is continued, while simultaneously increasing the drive motor speed, until a sixth operating condition (n) is reached.

It is important to note that the control sequence to again restore capacity to the system is significantly different from that just described (g, h, j, k, m, n) if the most energy-efficient path is followed. First the inlet guide vanes are gradually opened while the compressor drive motor speed is decreased as the system moves from the sixth operating condition (n) to the fifth operating condition (m). Then the inlet guide vanes are further opened while simultaneously increasing the motor speed, while the system moves from the fifth operating condition (m). Then the inlet guide vanes are further opened while simultaneously increasing the motor speed, while the system moves from the fifth operating condition (m) to the fourth operating condition (k). The opening of the inlet guide vanes is increased, and simultaneously the compressor drive motor speed is increased, as the system moves from the fourth operating condition (k) directly to the second operating condition (h), without going through the third operating condition (j). The inlet guide vanes are fully open at the second operating condition (h). Lastly, the compressor drive motor speed is increased to increase the system capacity, until the first operating condition (g) is again reached. More succintly, the method of the invention regulates the position of the inlet guide vanes and the speed of the compressor drive motor substantially according to the functional variations illustrated in FIG. 4 and described above, to avoid surge while operating in an energy-efficient manner.

Those skilled in the art will appreciate that the control system of the invention is similarly applicable to regulate a heat pump arrangement, in which both the speed of the compressor and the amount of gas admitted to the compressor are varied to follow an optimum control path.

To assist those skilled in the art to implement the invention, below is a list of the integrated circuit (IC) types, and identification of other components not already specified on FIGS. 6A-6C.

| IC Type | Stages (FIGS. 6A-6C) |
| --- | --- |
| MLM2902P | 59, 140, 148, 149 |
| MLM2902P | 136, 137, 138, 139 |
| MC14016BCP | 141, 142, 143, 144 |
| MLM2902P | 65, 101, 103, 104 |
| MLM2902P | 106, 110, 111, 156 |
| MLM2902P | 130, 146, 151, 153 |
| MC14016BCP | 123, 124, 125, 145 |
| CA3160S | 52 |
| MLM2902P | 160, 173, 174, 176 |
| MC14572BCP | 114, 115, 116, 117, 122, 132 |
| MC14023BCP | 120, 135, 162 |
| MC14001BCP | 108, 121, 165, 167 |
| MC14011BCP | 134, 164, 166, 170 |
| MC14001BCP | 118, 157, 163, 168 |
| MC14541BCP | 155 |
| T2310A | All Triacs |
| NSL5057 | All led's |
| 2N3415 | All transistors |
| 1N914 | All diodes |

With this explicit and detailed exposition of the inventive principles and a preferred embodiment of the control system, it is evident that such a system can be utilized both with existing equipment, by way of retrofit, and with newly installed systems.

In the appended claims the term "connected" means a d-c connection between two components with virtually zero d-c resistance between those components. The term "coupled" indicates there is a functional relationship between two components, with the possible interposition of other elements between the two components described as "coupled" or "intercoupled".

While only a particular embodiment of the invention has been described and claimed herein, it is apparent that various modifications and alterations of the invention may be made. It is therefore the intention in the appended claims to cover all such modifications and alterations as may fall within the true spirit and scope of the invention.

What is claimed is:

1. A control system for a refrigeration system including a compressor, a condenser, and an evaporator, all connected in a closed refrigeration circuit, which compressor includes an adjustable capacity control means, means for regulating the adjustable capacity control means, and an electrical prime mover connected to drive the compressor, which control system comprises:
   means for providing a timing signal;
   means for providing a position signal which varies as a function of the setting of the adjustable capacity control means; and
   a drive control circuit, having a first input coupled to the means for providing a timing signal, a second input coupled to the means for providing the position signal, and an output coupled to the means for regulating the adustable capacity control means, which drive control circuit produces an output drive signal having at least one characteristic which varies as a function of the position signal, thus driving the means for regulating the adjustable capacity control means as a function of the position of the adjustable capacity control means.

2. A control system as claimed in claim 1, in which a logic circuit is coupled between the drive control circuit and the means for regulating the adjustable capacity control means, and the output control signal is a pulse-width modulated signal having a pulse duration which varies as a function of the position signal.

3. A control system as claimed in claim 1, in which the adjustable capacity control means comprises a plurality of inlet guide vanes, the means for regulating the adjustable capacity control means is an electrical motor which is coupled to the inlet guide vanes, and the output control signal is applied to the electrical motor to adjust the position of the inlet guide vanes and correspondingly regulate the capacity of the compressor.

4. A control system as claimed in claim 3, in which an oscillator is the means for supplying a timing signal, and the means for providing the position signal includes a potentiometer having a movable arm, which potentiometer is mechanically connected such that the potentiometer arm position is a function of the position of the inlet guide vanes.

5. A control system for a refrigeration system including a compressor, a condenser, and an evaporator, all connected in a closed refrigeration circuit, which compressor includes a plurality of adjustable inlet guide vanes, a motor connected to regulate the inlet guide vanes position, and an electrical prime mover connected to drive the compessor, which control system comprises:
   an oscillator for providing a timing signal;
   means including a potentiometer connected to provide a position signal which varies as a function of the setting of the inlet guide vanes; and
   a drive control circuit, having a first input coupled to the oscillator, a second input coupled to the potentiometer which provides the position signal, and an output coupled to the motor which regulates the inlet guide vanes, which drive control circuit includes an integrator, a comparator, and a NOR gate, all intercoupled to produce an output drive signal having a pulse duration which varies as a function of the vane position signal, thus regulating the drive signal to the motor as a function of the position of the inlet guide vanes.

6. A control system for a refrigeration system including a compressor, a condenser, and an evaporator, all connected in a closed refrigeration circuit, which compressor includes an adjustable capacity control means, means for regulating the adjustable capacity control means, and an electrical prime mover connected to drive the compressor, which control system comprises:
  means for providing a timing signal;
  means for providing a position signal which varies as a function of the setting of the adjustable capacity control means;
  a drive control circuit, having a first input coupled to the means for providing a timing signal, a second input coupled to the means for providing the position signal, and an output coupled to the means for regulating the adjustable capacity control means, which drive control circuit produces an output signal having at least one characteristic which varies as a function of the position signal, thus regulating the adjustable capacity control means as a function of the position of the adjustable capacity control means; and
  a prime mover control circuit, including means for deriving a signal which varies as the compressor head, and means for utilizing the head-indicating signal to regulate the speed of the electrical prime mover such that combined control of the prime mover speed and the adjustable capacity control means is effected in an energy-conservation manner and without sending the compressor into surge.

7. A control system for a refrigeration system including a compressor, a condenser and an evaporator, all connected in a closed refrigeration circuit, which compressor includes an adjustable capacity control means, means for regulating the adjustable capacity control means, an electrical prime mover connected to drive the compressor, and means for regulating the speed of the prime mover, which control system comprises:
  a first circuit connected to provide a signal which connotes the head of the compressor, a second circuit connected to provide a signal to the means for regulating the electrical prime mover speed as a function of the head-connoting signal, and a third circuit connected to provide a signal to the means for regulating the adjustable capacity control means, such that combined control of the prime mover speed and the adjustable capacity control means is effected in an energy-conservation manner and compressor surge is avoided.

8. A control system as claimed in claim 7, in which the first circuit includes a first sensing means positioned to provide a first signal related to the refrigerant condensing temperature, a second sensing means positioned to provide a second signal related to the refrigerant evaporating temperature, and means for combining the first and second signals to provide the head-connoting signal.

9. A control system as claimed in claim 7, and further comprising means, coupled to the adjustable capacity control means, for providing an electrical signal which indicates the physical position of the capacity control means, and means for applying the position-indicating signal to the third circuit, to produce a drive signal for the means for regulating the adjustable capacity control means as a function of the capacity control means position.

10. A control system as claimed in claim 7, and further comprising a temperature sensing means positioned to provide a signal related to the chilled water discharge temperature from the evaporator, adjustable means for establishing a temperature set point signal, and means for combining the chilled water temperature signal and the temperature set point signal to produce a temperature error signal which is applied to the second circuit and the third circuit for use in controlling the operation of the refrigeration system, to assist in regulating both prime mover speed and the adjustable capacity control means.

11. A control system as claimed in claim 10, and further comprising a dead band circuit, coupled between the means for producing the temperature error signal and the second and third circuits, to avoid hunting and excessive switching in the control system.

12. A control system as claimed in claim 9, and further comprising a network, connected to modify the position-indicating signal and produce a modified signal for use in regulating the electrical prime mover.

13. A control system as claimed in claim 12, and further comprising means for combining the modified signal and the head-connoting signal to produce a combined signal, means for providing a signal related to the actual speed of the electrical prime mover, and means for combining the combined signal and the actual speed signal to produce a signal for regulating the speed of the electrical prime mover.

14. A control system as claimed in claim 10, and further comprising an unload control circuit, coupled to the adjustable means for establishing the temperature set point signal, operable to change the temperature set point, thus changing the load on the compressor and reducing the rate at which energy is consumed.

15. A control system for a refrigeration system including a compressor, a condenser, and an evaporator, all connected in a closed refrigeration circuit, which compressor includes adjustable inlet guide vanes, a position-controlling motor mechanically coupled to the inlet guide vanes, an a-c motor mechanically coupled to the compressor, an inverter connected to supply an a-c voltage to the a-c motor, and a logic circuit connected to regulate the frequency of the inverter output voltage as a function of a received speed control signal, which control system comprises;
  a first circuit, connected to provide a minimum Mach number signal, related to the compressor head, as a function of the difference between the condensing refrigerant temperature in the condenser and the evaporating refrigerant temperature in the evaporator;
  an inverter speed logic circuit, connected to provide said speed control signal to the inverter logic circuit;
  a PRV control logic circuit, connected to supply drive signals to the inlet guide vanes; and
  circuit means for utilizing said minimum Mach number signal in deriving control signals for the inverter speed logic circuit and the PRV control logic circuit.

16. A control system as claimed in claim 15, and further comprising a second circuit including a component coupled to the inlet guide vanes, for providing a functional signal related to the instantaneous position of the inlet guide vanes; and means for combining the functional signal with the minimum Mach number signal, to provide a signal for use in regulating the speed of the a-c motor.

17. A control system as claimed in claim 16, in which the component in the second circuit is a potentiometer having a movable arm, and the second circuit further comprises a network having a plurality of stages intercoupled to provide said functional signal as the potentiometer arm is displaced as a result of movement of the inlet guide vanes.

18. A control system as claimed in claim 16, and further comprising means for providing a signal which varies as a function of the actual speed of the a-c motor, and means for combining this motor-speed-indicating signal with the resultant of the functional and minimum Mach number signals, to provide a speed boost signal for use in regulating the inverter speed logic circuti and thus controlling the speed of the a-c motor driving the compressor.

19. A control system as claimed in claim 18, and further comprising means for providing a signal related to the temperature of chilled water discharged from the evaporator, adjustable means for establishing a temperature set point signal, and means for combining the chilled water temperature signal with the temperature set point signal, to produce a temperature error signal for application to the inverter speed logic circuit.

20. A control system as claimed in claim 18, and further comprising means for combining the actual motor speed signal with the minimum Mach number signal, to produce a logical signal for application to the inverter speed logic circuit and to the PRV control logic circuit.

21. The method of controlling a refrigeration system having a compressor, a condenser, and an evaporator, all connected in a closed refrigeration circuit, which compressor includes adjustable inlet guide vanes to vary the compressor capacity, and an electrical adjustable speed motor connected to drive the compressor, such that motor speed adjustment also varies the capacity, comprising the steps of:
continually establishing a compressor head signal as a function of the condensing refrigerant and evaporating refrigerant temperatures;
deriving a functional signal related to the instantaneous position of the inlet guide vanes;
combining the head-indicating signal and the functional signal to produce an intermediate signal;
providing a signal related to the actual motor speed;
combining the actual motor speed signal and the intermediate signal to provide a first signal for use in regulating the speed of the compressor drive motor; and
deriving a temperature error signal, related to the difference in temperature between the cooling medium at the evaporator outlet and the desired temperature set point, and employing the temperature error signal as a second signal for use in regulating both the speed of the compressor drive motor and the position of the inlet guide vanes.

22. The method of control described in claim 21, in which the compressor drive motor speed and the inlet guide vanes position are regulated to reduce system capacity, in accordance with the following steps taken in sequence;
reducing the compressor drive motor speed, while the inlet guide vanes remain wide open, from a first operating condition, through a second operating condition to a third operating condition;
gradually closing the inlet guide vanes, and simultaneously increasing the compressor drive motor speed, to reach a fourth operating condition;
continuing to close the inlet guide vanes while simultaneously reducing the drive motor speed, to reach a fifth operating condition; and
thereafter continuing to close the inlet guide vanes while simultaneously increasing the drive motor speed, until a sixth operating condition is reached.

23. The method of control described in claim 22, and further comprising the following steps, taken in sequence, to again restore capacity to the system;
gradually opening the inlet guide vanes while decreasing the compressor drive motor speed as the system moves from the sixth operating condition to the fifth operating condition;
continuing to open the inlet guide vanes while simultaneously increasing the motor speed, while the system moves from the fifth operating condition to the fourth operating condition;
continuing to increase the opening of the inlet guide vanes, and simultaneously increasing the compressor drive motor speed, as the system moves from the fourth operating condition directly to the second operating condition without going through the third operating condition, with the inlet guide vanes being fully open at the second operating condition; and
continuing to increase the compressor drive motor speed to increase the system capacity, until the first operating condition is reached.

24. The method of regulating a refrigeration system including a compressor having adjustable guide vanes and driven by a variable speed motor, in which the position of the inlet guide vanes and the speed of the compressor drive motor are jointly regulated substantially according to the functional variations illustrated in FIG. 4 and described in the specification, to avoid surge while operating in an energy-efficient manner.

* * * * *